United States Patent
Syed et al.

(10) Patent No.: US 11,584,376 B2
(45) Date of Patent: Feb. 21, 2023

(54) METHOD FOR OPERATING A VEHICLE HAVING A DRIVELINE DISCONNECT CLUTCH

(71) Applicant: Ford Global Technologies, LLC, Dearborn, MI (US)

(72) Inventors: Fazal Urrahman Syed, Canton, MI (US); Rajit Johri, Canton, MI (US); Shailesh Shrikant Kozarekar, Novi, MI (US); Thomas Scott Gee, Canton, MI (US); Ming Lang Kuang, Canton, MI (US); Kevin Ray Ruybal, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 16/786,073

(22) Filed: Feb. 10, 2020

(65) Prior Publication Data
US 2021/0245751 A1 Aug. 12, 2021

(51) Int. Cl.
*B60W 30/188* (2012.01)
*B60W 20/15* (2016.01)
*B60W 40/13* (2012.01)

(52) U.S. Cl.
CPC .......... *B60W 30/188* (2013.01); *B60W 20/15* (2016.01); *B60W 40/13* (2013.01); *B60W 2040/1369* (2013.01); *B60W 2510/0266* (2013.01); *B60W 2510/0275* (2013.01); *B60W 2510/081* (2013.01); *B60W 2710/083* (2013.01)

(58) Field of Classification Search
CPC .... B60W 30/188; B60W 20/15; B60W 40/13; B60W 2040/1369; B60W 2510/0266; B60W 2510/0275; B60W 2510/081; B60W 2710/083; B60W 10/02; B60W 10/06; B60W 10/08; B60W 20/40; B60W 2030/206; B60W 2710/023; B60W 2540/10; B60W 10/024; B60K 2006/268; B60K 2006/4825; B60K 6/387; F02N 5/04; F02N 11/04; F02N 2200/022; F02N 2200/042; F02N 2300/104
USPC .......................................................... 701/22
See application file for complete search history.

(56) References Cited

U.S. PATENT DOCUMENTS

| | | | |
|---|---|---|---|
| 5,726,353 A | 3/1998 | Matsuda et al. | |
| 10,308,233 B2 | 6/2019 | Johri et al. | |
| 2013/0291830 A1* | 11/2013 | Doering | F02D 41/023 123/350 |
| 2015/0051045 A1* | 2/2015 | Gibson | B60W 10/06 180/65.265 |
| 2020/0122708 A1* | 4/2020 | Kucharski | F02N 11/0851 |
| 2020/0245751 A1* | 8/2020 | Thenin | A46B 9/021 |

* cited by examiner

*Primary Examiner* — Scott A Reinbold
(74) *Attorney, Agent, or Firm* — David Kelley; McCoy Russell LLP

(57) ABSTRACT

A method for operating a vehicle that includes a driveline disconnect clutch is described. In one example, the method adjusts torque of an electric machine in response to a estimated torque capacity of the driveline disconnect clutch. The estimated torque capacity of the driveline disconnect clutch is based on a combined inertia of a dual mass flywheel and the driveline disconnect clutch.

6 Claims, 4 Drawing Sheets

METHOD FOR OPERATING A VEHICLE HAVING A DRIVELINE DISCONNECT CLUTCH

FIELD

The present description relates to methods and a system for operating a vehicle that includes a driveline disconnect clutch. The methods and systems may improve driveline operation via improving estimates of driveline disconnect clutch torque.

BACKGROUND AND SUMMARY

A vehicle may include a driveline disconnect clutch to isolate a first portion of a driveline from a second portion of the driveline. In particular, the driveline disconnect clutch may be positioned in a driveline between a dual mass flywheel and an integrated starter/generator. The dual mass flywheel may be coupled to an engine and to the driveline disconnect clutch. The driveline disconnect clutch may be opened when driver demand torque is low so that the engine may be stopped to conserve fuel. The integrated starter/generator may be the sole propulsion source providing propulsive effort to the vehicle's wheels when the driveline disconnect clutch is open. During conditions when driver demand torque is greater than a threshold torque, the driveline disconnect clutch may be closed so that the engine, or the engine and the integrated starter/generator, may meet the driver demand torque and propel the vehicle. The driveline disconnect clutch may also be closed to start the engine via torque generated via the integrated starter/generator.

The driveline disconnect clutch's torque capacity (e.g., a maximum amount of torque that the driveline disconnect clutch may transfer when a given or particular pressure is applied to close the driveline disconnect clutch) may be adjusted to control an amount of torque that is transferred through the driveline disconnect clutch. The driveline disconnect clutch may transfer an amount of torque that is equal to or less than the driveline disconnect clutch torque capacity. If the amount of torque transferred through the driveline disconnect clutch is not estimated accurately, then driveline torque disturbances may result. Therefore, it may be desirable to provide an accurate estimate of the amount of torque that is being transferred through a driveline disconnect clutch so that the possibility of driveline torque disturbances may be reduced.

The inventors herein have recognized the above-mentioned issues and have developed a vehicle operating method, comprising: estimating an amount of torque transferred through a driveline disconnect clutch via a combined inertia of one side of a dual mass flywheel and one side of the driveline disconnect clutch; and adjusting torque of an integrated starter/generator via a controller in response to the amount of torque transferred through the driveline disconnect clutch.

By adjusting a torque of an electric machine in response to an estimated torque capacity of a driveline disconnect clutch that is at least partially based on a combined inertia of one side of a dual mass flywheel and one side of the driveline disconnect clutch, it may be possible to provide the technical result of improving an amount of torque transferred through a driveline disconnect clutch since inertias of the driveline disconnect clutch and the dual mass flywheel may affect the estimate of the amount of torque transferred through the driveline disconnect clutch.

The present description may provide several advantages. Specifically, the approach may reduce driveline torque disturbances during engine starting. The approach may also estimates an amount of torque that is transferred through the driveline disconnect clutch during engine starting. In addition, the approach may improve estimates of how much torque is transferred through the driveline disconnect clutch when the driveline disconnect clutch is closed.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to estimating an amount of torque that is transferred through a driveline disconnect clutch. The amount of torque that is transferred through the driveline disconnect clutch may be the basis for adjusting torque of an electric machine during starting of an engine when the driveline disconnect clutch is closed to couple the engine to the electric machine. The driveline may include an internal combustion engine of the type shown in FIG. 1. The engine may be included in a driveline or powertrain as shown in FIG. 2. The driveline may be modeled according to FIGS. 3A and 3B. The amount of torque that is transferred through the driveline disconnect clutch may be estimated according to the method shown in FIG. 4. Further, the driveline may be operated according to the method shown in FIG. 4.

Figure 1:
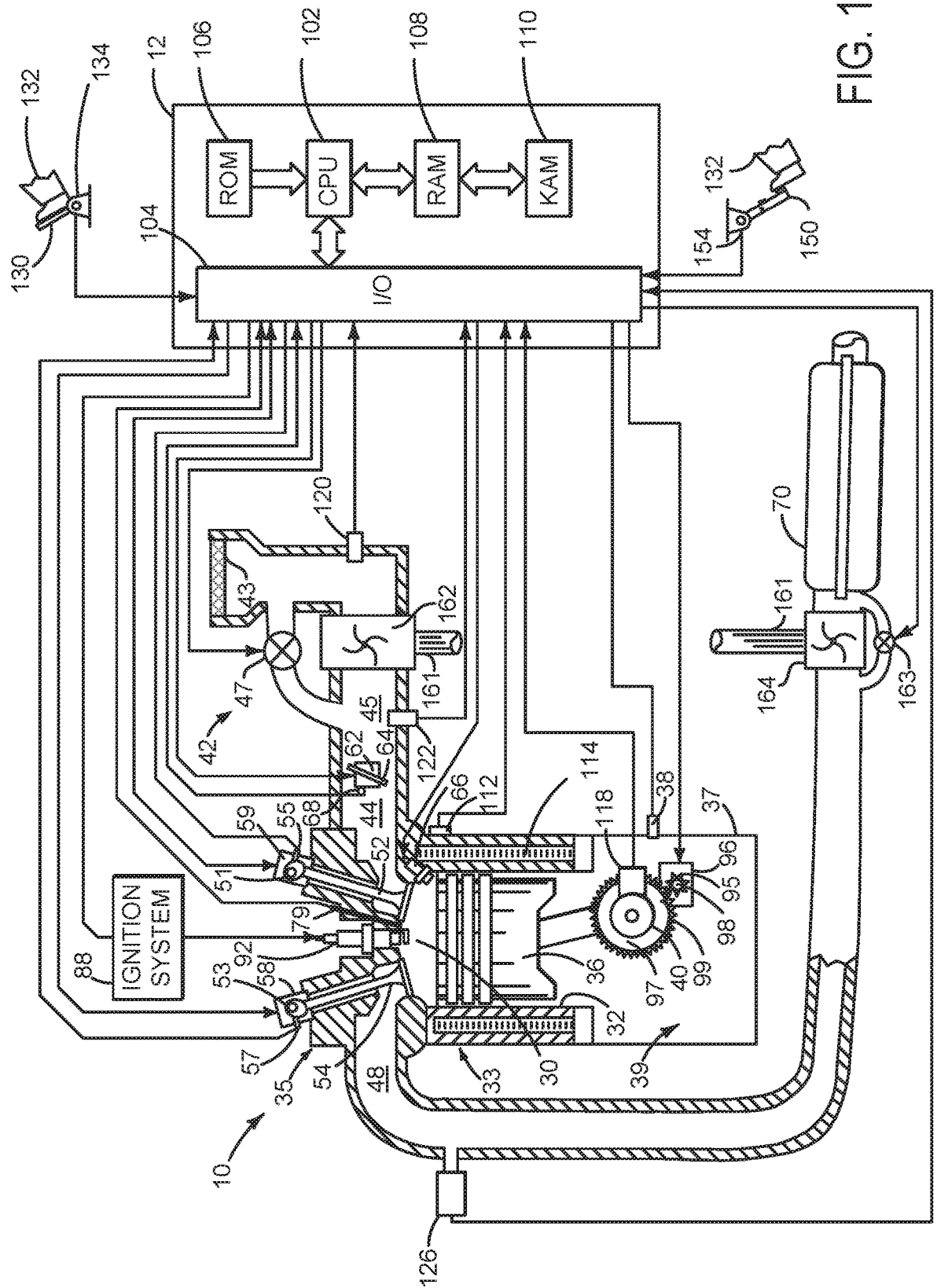
FIG. 1 shows a schematic diagram of an internal combustion engine.
Figure 2:
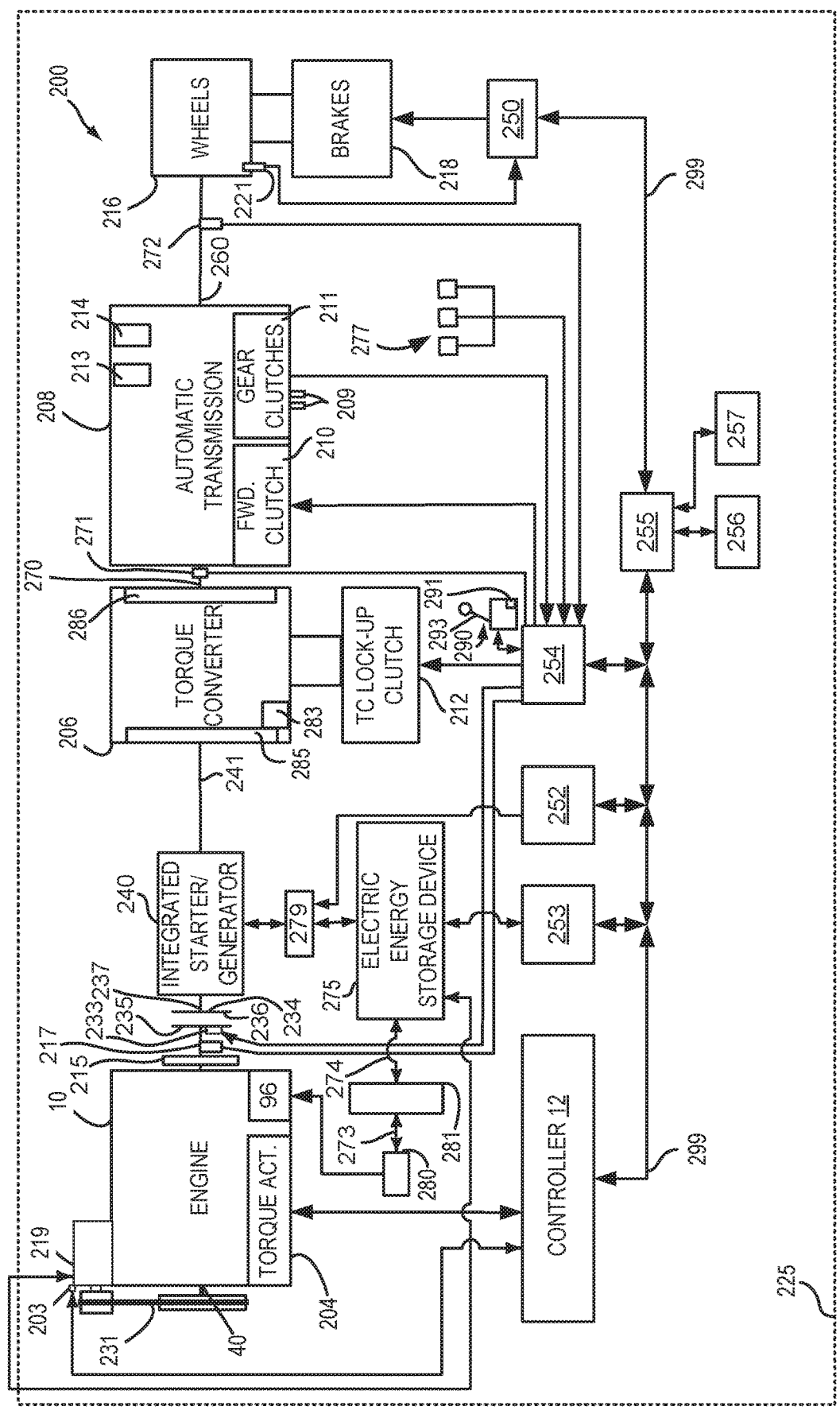
FIG. 2 shows a schematic diagram of an example vehicle driveline or powertrain including the internal combustion engine shown in FIG. 1.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A phase or position of intake valve 52 may be adjusted relative to a position of crankshaft 40 via valve phase changing device 59. A phase or position of exhaust valve 54 may be adjusted relative to a position of crankshaft 40 via valve phase changing device 58. Valve phase changing devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. Pressure in crankcase 39 may be sensed via pressure sensor 38. Alternatively, pressure in crankcase 39 may be estimated.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; cylinder pressure from pressure sensor 79; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231. BISG 219 may be coupled to crankshaft 40 or a camshaft (e.g., 51 or 53 of FIG. 1). BISG 219 may operate as a motor when supplied with electrical power via electric energy storage device 275 or low voltage battery 280. BISG 219 may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 may selectively supply electrical energy to starter motor 96.

An engine output power may be transmitted to a first or upstream side of powertrain disconnect clutch 235 through dual mass flywheel 215. Speed of the dual mass flywheel on the output side of the dual mass flywheel may be determined via position sensor 217. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative torque of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a vehicle system, comprising: an engine; a dual mass flywheel coupled to the engine and a driveline disconnect clutch; an electric machine coupled to the driveline disconnect clutch; a torque converter coupled to the electric machine and a step ratio transmission; a controller including executable instructions stored in non-transitory memory to estimate an amount of torque transferred through the driveline disconnect clutch via a spring torque of the dual mass flywheel and combined inertia of one side of the dual mass flywheel and one side of the driveline disconnect clutch, and additional instructions to adjust a torque of the electric machine in response to the amount of torque transferred through the driveline disconnect clutch. The vehicle system further comprises additional instructions to estimate the amount of torque transferred through the driveline disconnect clutch based on a damping constant of the dual mass flywheel.

In some examples, the vehicle system further comprises additional instructions to determine a base electric machine torque request that is based on a speed of the electric machine, a driveline operating mode, and an electric machine torque request. The vehicle system further comprises additional instructions to determine a base torque request for the engine based on an instantaneous driver demand torque. The vehicle system includes where the torque of the electric machine is adjusted during starting of the engine. The vehicle system includes where the torque of the electric machine is adjusted when the driveline disconnect clutch is being closed. The vehicle system further comprises additional instructions to determine a torque request for the electric machine based on a difference in a driver demand torque and an engine torque.

Figure 3A:
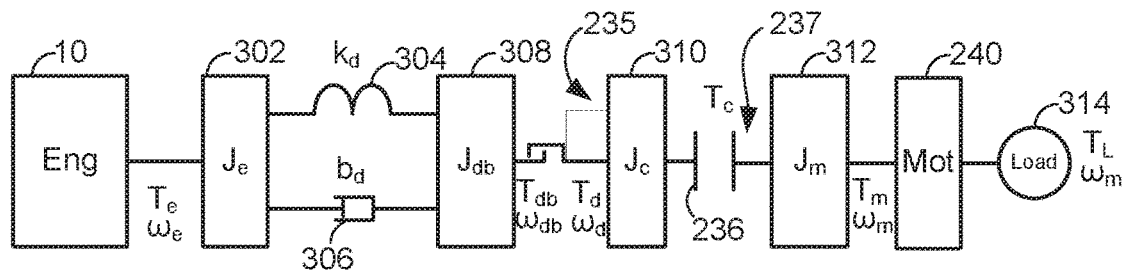
FIGS. 3A and 3B show example driveline models.

Referring now to FIG. 3A, a block diagram that illustrates a model of the vehicle driveline of FIG. 2 is shown. Engine 10 includes inertia $J_e$ as indicated at block 302. The engine inertia Je represents the combined inertia of the engine 10 and inertia of an input side of the dual mass flywheel 215, which are rigidly coupled together. The engine torque is shown as $T_e$ and the engine speed is shown as $\omega_e$. The dual mass flywheel springs are indicated at 304 and they have a spring constant $K_d$. The dual mass flywheel also has a damping component 306 with a damping constant $b_d$. The intermediate inertia is indicated at block 308 as $J_{db}$. The intermediate inertia is a modeled inertia to compensate for backlash in the dual mass flywheel 215. The dual mass flywheel torque before the backlash region is identified as $T_{db}$ and the dual mass flywheel speed before the backlash region is identified as $\omega_{db}$. The dual mass flywheel output torque is indicated as $T_d$ and the dual mass flywheel output speed is indicated as $\omega_d$.

The torque on input side 237 of the driveline disconnect clutch 236 is $T_d$ and the speed on the input side 237 of the driveline disconnect clutch 236 is $\omega_d$. The amount of torque transmitted through the driveline disconnect clutch is indicated as Tc, and Tc may or may not equal the driveline disconnect clutch torque capacity. The inertia of motor or electric machine 240 is indicated at block 312 as $J_m$. The load that is applied to the motor (e.g., the transmission, torque converter, and road load) is indicated at block 314. The load torque is indicated as $T_L$ and the electric machine speed is indicated as $\omega_m$. The driveline disconnect clutch output side speed is also equal to $\omega_m$.

The dynamic equations for the system of FIG. 3A may be characterized as:

$$J_e \frac{d\omega_e}{dt} = T_e - K_d \times (\theta_e - \theta_d) - b_d \times (\omega_e - \omega_d) \tag{1}$$

$$J_{db} \frac{dw_{db}}{dt} = K_d \times (\theta_e - \theta_d) + b_d \times (w_e - w_d) - T_{db} \tag{2}$$

$$T_d = \begin{cases} 0 & -\theta_b < (\theta_e - \theta_d) < \theta_b \\ T_{db} & \text{otherwise} \end{cases} \tag{3}$$

$$J_c \frac{dw_d}{dt} = T_d - T_c \tag{4}$$

$$J_m \frac{dw_m}{dt} = T_c + T_m - T_L \tag{5}$$

Figure 3B:
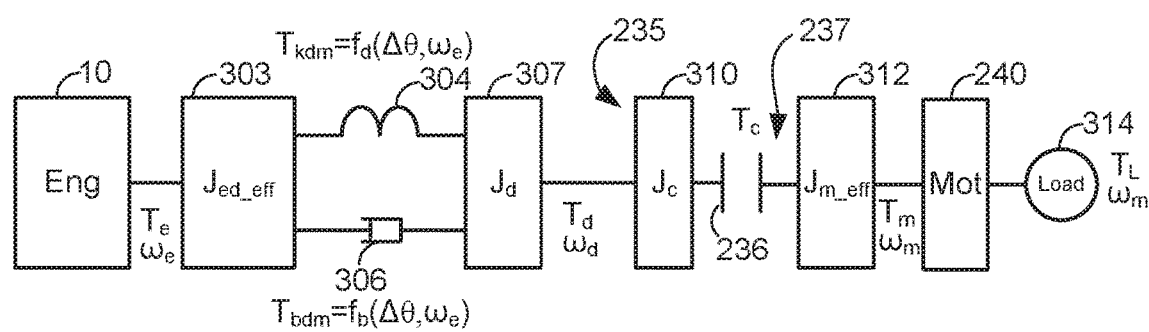

The model of FIG. 3A may be simplified into the mode of FIG. 3B by making $K_d$ and $b_d$ a function of $(\theta_e - \theta_d)$ and $\omega_e$. The model of FIG. 3B replaces engine inertia Je with the effective inertia of the engine and the inertia of the input side of the dual mass flywheel inertia $J_{ed\_eff}$. In addition, the dual mass flywheel spring constant $K_d$ is replace by modified dual mass flywheel spring torque $T_{kdm}$, where $f_d$ is a function that returns $T_{kdm}$ and $\Delta\theta$ is $(\theta_e - \theta_d)$. The dual mass flywheel damping ratio $b_d$ is replaced by the modified dual mass flywheel damping torque $T_{bdm}$, where $f_b$ is a function that returns $T_{bdm}$. Engine 10 includes engine inertia $J_e$ as indicated at block 302. The inertia $J_{db}$ is also replaced by dual mass flywheel output inertia Jd. The motor inertia $J_m$ is also replaced by the effective motor inertia $J_{m\_eff}$. The remaining variables shown in FIG. 3B are the same as those shown in FIG. 3A with the same identifiers. Equations (1) and (2) can be rewritten in simplified form with the assumption that $K_d$ and $b_d$ are functions of $(\theta_e - \theta_d)$ and $\omega_e$ and equations (1) to (5) can be reduced and rewritten as follows:

$$J_e \frac{dw_e}{dt} = T_e - f_d(\Delta\theta, w_e) - (w_d - w_e) \times f_b(\Delta\theta, w_e) \quad (6)$$

$$J_d \frac{dw_d}{dt} = f_d(\Delta\theta, w_e) + (w_d - w_e) \times f_b(\Delta\theta, w_e) - T_d \quad (7)$$

$$J_c \frac{dw_d}{dt} = T_d - T_c \quad (8)$$

$$J_m \frac{dw_m}{dt} = T_c + T_m - T_L \quad (9)$$

where $\Delta\theta = (\theta_e - \theta_d)$, $T_{Kdm} = f_d(\Delta\theta, w_e)$, $T_{bdm} = (w_d - w_e) \times f_b(\Delta\theta, w_e)$, $T_{Kdm}$ is the modified spring torque and is $T_{bdm}$ the modified damping torque.

Solving equations (7) and (8), the final control equation for determining torque through the disconnect clutch is:

$$T_c = f_d(\Delta\theta, \omega_e) + (\omega_d - \omega_e) \times f_b(\Delta\theta, \omega_e) - J_c \frac{d\omega_d}{dt} - J_d \frac{d\omega_d}{dt} \quad (10)$$

If $J_{dc}$ represent the combined inertia of secondary side of dual mass flywheel 215 and driveline disconnect clutch ($J_d + J_c$), then equation (10) can be rewritten as follows:

$$T_c = f_d(\Delta\theta, \omega_e) + (\omega_d - \omega_e) \times f_b(\Delta\theta, \omega_e) - J_{dc} \frac{d\omega_d}{dt} \quad (11)$$

Figure 4:
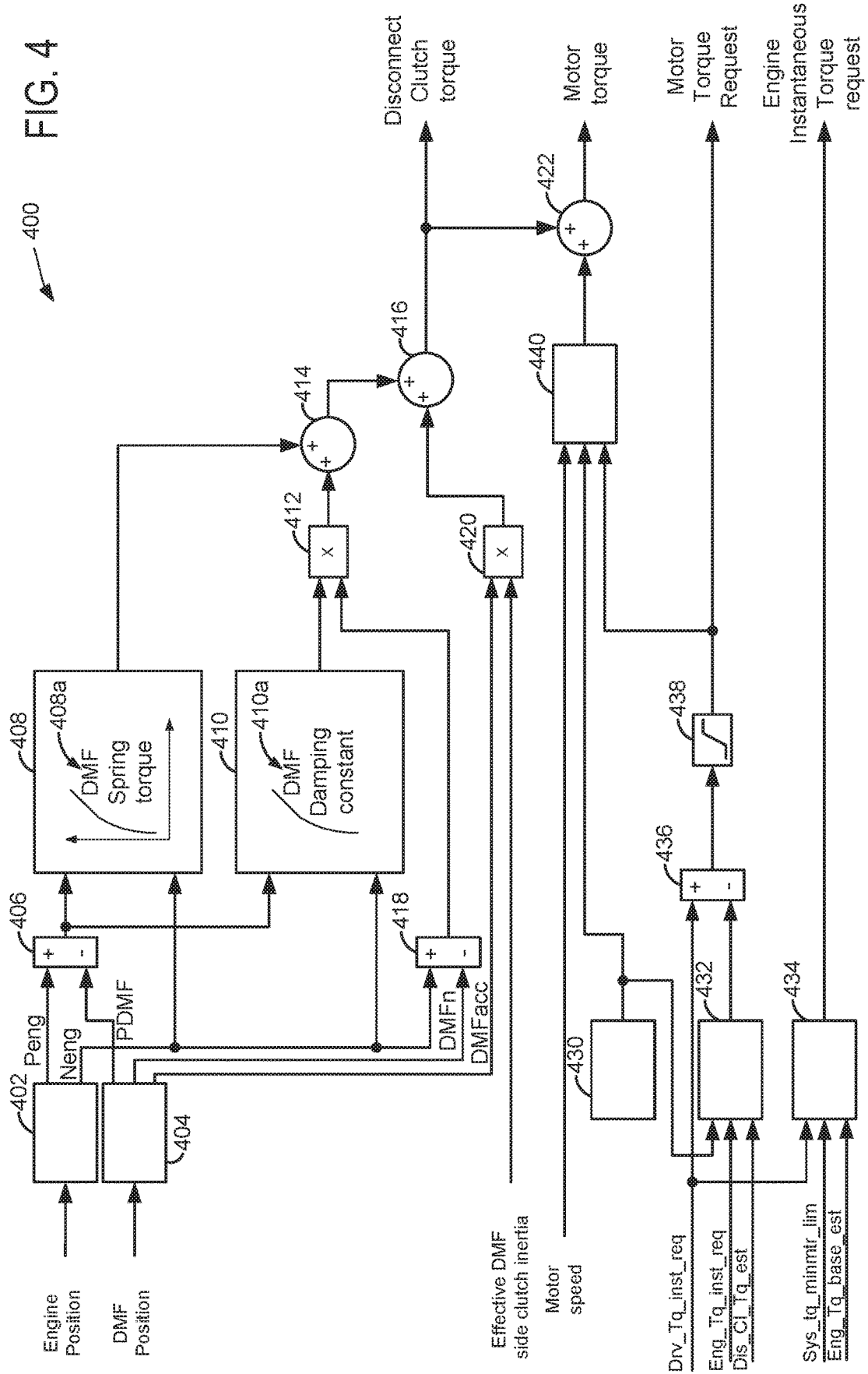
FIG. 4 shows a block diagram of a method for controlling driveline torque and estimating driveline disconnect clutch torque capacity.

Equation 11 may be the basis for building the controller shown in FIG. 4. Equation 11 delivers Tc, which is a direct estimate of driveline disconnect clutch torque determined from measured speed and positions on each side of the dual mass flywheel combined with the dual mass flywheel spring and damper transfer functions. The controller shown in FIG. 4 estimates the amount of torque that is transferred through the driveline disconnect clutch and adjusts electric machine torque according to the amount of torque that is transferred through the driveline disconnect clutch.

Referring now to FIG. 4, method 400 for operating a vehicle is shown in the form of a block diagram. At least portions of method 400 may be implemented as executable controller instructions stored in non-transitory memory. Method 400 may operate in cooperation with the system of FIGS. 1 and 2. Additionally, portions of method 400 may be actions taken in the physical world to transform an operating state of an actuator or device. The method of FIG. 4 may be incorporated into the system of FIGS. 1 and 2 as executable instructions stored in non-transitory memory. Method 400 may be executed when the vehicle is operating, such as when the driveline disconnect clutch is being closed and when the engine is being started.

At 402, method 400 converts engine position into engine speed (e.g., Neng) and engine speed is output to blocks 408, 410, and 418. Engine position (e.g., Peng) is output to block 406. Engine position may be converted into engine speed via converting a rotational distance traveled by determining the amount of time it takes the engine's crankshaft to rotate one revolution (e.g., 360 degrees) into revolutions per minute.

At 404, method 400 converts dual mass flywheel position into dual mass flywheel speed (DMFn), dual mass flywheel acceleration (DMFacc), and block 404 outputs DMFn, DFMacc, and dual mass flywheel position (PDMF). Block 404 converts PDMF into DMFn by determining the amount of time it takes for the DMF to rotate 360 degrees and converting revolutions/second into revolutions per minute.

Block 404 may determine DMFacc via taking the derivative of DMFn. Block 400 outputs DMFacc to block 420. Block 404 also outputs PDMF to block 406 and outputs DMFn to block 418.

Block 406 determines $\Delta\Theta$ (e.g., $\Theta_e - \Theta_d$) by subtracting the dual mass flywheel output side angle from the engine angle as determined from engine position and DMF position. Block 406 outputs the $\Delta\Theta$ value to blocks 408 and 410. Block 408 outputs a dual mass flywheel spring torque. Block 408 determines the dual mass flywheel spring torque via referencing or indexing a table or function 408a via $\Delta\Theta$ and engine speed $\omega_e$. Values in the table or function 408a may be determined via applying a torque to the dual mass flywheel and measuring the change in dual mass flywheel output angle with respect to dual mass flywheel input angle. The change in the dual mass flywheel output angle with respect to dual mass flywheel input angle is indicative of the amount of torque that is applied to the dual mass flywheel. The dual mass flywheel spring torque is output from block 408 and input to summing junction 414.

Block 410 outputs a dual mass flywheel damping constant. Block 410 determines the dual mass flywheel damping constant via referencing or indexing a table or function 410a via $\Delta\Theta$ and engine speed $\omega_e$. Values in the table or function 410a may be determined via applying a torque to the dual mass flywheel and measuring the phase response of dual mass flywheel output angle with respect to dual mass flywheel input position. The change in phase of the dual mass flywheel output angle with respect to dual mass flywheel input angle may be indicative of the damping constant of the dual mass flywheel. The dual mass flywheel damping constant is output from block 410 and input to summing junction 412.

At block 418, block diagram 400 determines the difference between engine speed and dual mass flywheel speed. The difference between engine speed and dual mass flywheel speed is input to block 412. Block 412 multiplies the dual mass flywheel damping constant by the difference between engine speed and dual mass flywheel speed. Block 412 outputs the dual mass flywheel speed multiplied by the difference between engine speed and dual mass flywheel speed to summing junction 414. The output from summing junction 414 is the sum of output from block 412 and the output from block 408. The output from summing junction 414 is input to summing junction 416.

The effective dual mass flywheel side inertia of the driveline disconnect clutch is input to block 420. The inertia of the driveline disconnect clutch that is on the dual mass flywheel side of the driveline disconnect clutch may be empirically determined via the mass and the physical dimensions of the driveline disconnect clutch and the dual mass flywheel. The dual mass flywheel acceleration is multiplied by the acceleration of the dual mass flywheel (e.g., T=J$\omega$) to determine torque to accelerate the dual mass flywheel side of the driveline disconnect clutch. The torque to accelerate the dual mass flywheel side of the driveline disconnect clutch is output from block 420 and input to block 416. Summing junction 416 adds torque that dynamically accelerates the dual mass flywheel side of the driveline disconnect clutch with the torque that accelerates the engine. The output of block 416 is the amount of torque that is being transferred via the driveline disconnect clutch. This torque may be referred to as the driveline disconnect clutch torque. The driveline disconnect clutch torque is output to summing junction 422 and to vehicle systems that use and apply the driveline disconnect clutch torque.

Speed of the electric machine 240 or motor speed is input to block 440 along with a torque request for the electric machine and the powertrain operating mode. Block 440 outputs a base electric machine torque request. The base electric machine torque request is determined via an algorithm that coordinates engine and electric machine torque with other system components (e.g., transmission, traction battery, etc.) to deliver driver demand wheel torque and vehicle acceleration while maintaining traction battery state of charge (SOC). The base electric machine torque request and the driveline disconnect clutch torque are added together at summing junction 422. The torque output of summing junction 422 is the requested electric machine torque.

Block 430 determines the present powertrain operating mode. The present powertrain operating mode may be determined via an algorithm that selects engine, electric machine, driveline disconnect clutch, and transmission states to deliver the requested driver demand wheel torque. Arbitrated estimated engine torque is determined at block 432. Powertrains operating mode, engine instantaneous torque request (Eng_Tq_inst_req), and disconnect clutch torque estimate (Dis_Cl_Tq_est) are input to block 432. The engine instantaneous torque request may be determined via an algorithm that determines engine torque needed to provide the driver demand torque given the driver demand torque, engine torque capacity, and electric machine torque capacity. The disconnect clutch torque estimate (Dis_Cl_Tq_est) may be determined via a transfer function or relationship that identifies disconnect clutch fluid pressure to driveline disconnect clutch torque capacity. Block 432 determines the estimated engine torque that is delivered to the electric machine 240 via the engine. The estimated engine torque and the disconnect clutch torque capacity are the basis for determining the estimated engine torque that is delivered to the electric machine 240. The estimated engine torque is input into block 436 along with the driver instantaneous torque request (Drv_Tq_inst_req) where the arbitrated engine torque is subtracted from the driver instantaneous torque request. The output of block 436 is input to block 438 where it is limited to not exceed a first threshold and to not be less than a second threshold. The output of block 438 is an electric machine (e.g., 240) torque request. Block 434 determines a base engine instantaneous torque request from a system motor torque limit (Sys_tq_minmtr_lim), driver instantaneous torque request (Drv_Tq_inst_req), and a base engine torque request (Eng_Tq_base_est).

In this way, an amount of torque that is transmitted through a driveline disconnect clutch may be determined. In addition, the driveline disconnect clutch torque may be used to determine an electric machine torque.

Thus, the method of FIG. 4 may provide for a vehicle operating method, comprising: estimating an amount of torque transferred through a driveline disconnect clutch via a controller and a combined inertia of one side of a dual mass flywheel and one side of the driveline disconnect clutch; and adjusting torque of an integrated starter/generator in response to the amount of torque transferred through the driveline disconnect clutch. The method includes where the driveline disconnect clutch is positioned between the dual mass flywheel and the integrated starter/generator. The method further comprises adjusting a torque request of the integrated starter/generator based on the amount of torque transferred through the driveline disconnect clutch. The method further comprises adjusting a torque request of an engine while adjusting the torque request of the integrated starter/generator. The method further comprises adjusting torque of the integrated starter/generator in further response to a base integrated starter/generator torque request. The method includes where the base integrated starter/generator torque request is based on a speed of the integrated starter/generator. The method includes where the base integrated starter/generator torque request is based on a presently activated driveline operating mode.

The method of FIG. 4 also provides for a vehicle operating method, comprising: estimating an amount of torque transferred through a driveline disconnect clutch via a controller, a damping constant of a dual mass flywheel, and a combined inertia of one side of the dual mass flywheel and one side of the driveline disconnect clutch; and adjusting torque of an integrated starter/generator in response to the estimated amount of torque transferred through the driveline disconnect clutch. The method further comprises estimating the amount of torque transferred through the driveline disconnect clutch base further upon a spring torque of the dual mass flywheel. The method includes where the spring torque of the dual mass flywheel is estimated via a speed of an engine and an engine angle minus a dual mass flywheel angle. The method includes where the damping constant of the dual mass flywheel is based on engine speed and an engine angle minus a dual mass flywheel angle. The method further comprises closing the driveline disconnect clutch while adjusting the torque of the integrated starter/generator. The method further comprises starting an engine while adjusting the torque of the integrated starter/generator in response to the estimated amount of torque transferred through the driveline disconnect clutch.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
   estimating an amount of torque transferred through a driveline disconnect clutch via a controller, a dual mass flywheel damping torque, a dual mass flywheel spring torque, inertia of one side of the dual mass flywheel, and inertia of the driveline disconnect clutch; and
   adjusting torque of an integrated starter/generator in response to the estimated amount of torque transferred through the driveline disconnect clutch.

2. The method of claim 1, where the dual mass flywheel spring torque is based on an engine speed and a difference between an engine angle and a dual mass flywheel angle.

3. The method of claim 2, where the inertia of one side of the dual mass flywheel and the inertia of the driveline disconnect clutch are subtracted from the dual mass flywheel damping torque.

4. The method of claim 2, where the dual mass flywheel damping torque is based on engine speed and an engine angle minus a dual mass flywheel angle.

5. The method of claim 1, further comprising closing the driveline disconnect clutch while adjusting the torque of the integrated starter/generator.

6. The method of claim 1, further comprising starting an engine while adjusting the torque of the integrated starter/generator in response to the estimated amount of torque transferred through the driveline disconnect clutch.

* * * * *